(12) United States Patent
Onishi et al.

(10) Patent No.: US 11,444,503 B2
(45) Date of Patent: Sep. 13, 2022

(54) MOTOR AND METHOD OF MANUFACTURING MOTOR

(71) Applicant: Nidec Corporation, Kyoto (JP)

(72) Inventors: Tatsuya Onishi, Kyoto (JP); Kosuke Ogawa, Kyoto (JP); Takashi Seguchi, Kyoto (JP); Shunsuke Murakami, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 257 days.

(21) Appl. No.: 16/637,286

(22) PCT Filed: Sep. 28, 2018

(86) PCT No.: PCT/JP2018/036191
§ 371 (c)(1),
(2) Date: Feb. 7, 2020

(87) PCT Pub. No.: WO2019/065944
PCT Pub. Date: Apr. 4, 2019

(65) Prior Publication Data
US 2020/0251949 A1 Aug. 6, 2020

(30) Foreign Application Priority Data

Sep. 28, 2017 (JP) .............................. JP2017-188045
Sep. 29, 2017 (JP) .............................. JP2017-191095
Mar. 30, 2018 (JP) .............................. JP2018-069781

(51) Int. Cl.
*H02K 3/52* (2006.01)
*B23K 26/22* (2006.01)
*H02K 15/00* (2006.01)

(52) U.S. Cl.
CPC ............. *H02K 3/522* (2013.01); *B23K 26/22* (2013.01); *H02K 15/0062* (2013.01); *H02K 2203/09* (2013.01)

(58) Field of Classification Search
CPC ............................ H02K 3/28; H02K 2203/09
See application file for complete search history.

(56) References Cited

U.S. PATENT DOCUMENTS 8,841,813 B2 9/2014 Junak et al.
2003/0201688 A1* 10/2003 Yamamura ............. H02K 3/522
310/71
(Continued)

FOREIGN PATENT DOCUMENTS

CN 102577028 A 7/2012
FR 3046505 A1 * 7/2017
(Continued)

OTHER PUBLICATIONS

Official Communication issued in International Patent Application No. PCT/JP2018/036191, dated Oct. 30, 2018.
(Continued)

*Primary Examiner* — Quyen P Leung
*Assistant Examiner* — Minki Chang
(74) *Attorney, Agent, or Firm* — Keating & Bennett

(57) ABSTRACT

A motor includes a rotor including a shaft extending along a central axis, a stator including a coil and opposing the rotor in a radial direction with a gap, and a busbar positioned at one axial-directional side of the stator. The busbar includes a conducting wire-connecting portion connected to a conducting wire extending from the coil. A notch into which the conducting wire is inserted is provided in the conducting wire connecting portion. An inner circumferential surface of the notch includes a bottom surface opposing an opening side of the notch, a first opposed surface extending from the bottom surface towards the opening, and a second opposed surface extending from the bottom surface towards the opening and opposing the first opposed surface.

16 Claims, 12 Drawing Sheets

(56) References Cited

U.S. PATENT DOCUMENTS

| | | |
|---|---|---|
| 2010/0133935 A1 | 6/2010 | Kinugawa et al. |
| 2012/0262014 A1* | 10/2012 | Katou .................... H02K 3/522 |
| | | 310/71 |
| 2015/0357878 A1 | 12/2015 | Fukunaga et al. |
| 2016/0294248 A1 | 10/2016 | Atarashi et al. |

FOREIGN PATENT DOCUMENTS

| | | | |
|---|---|---|---|
| JP | 2007-209186 A | | 8/2007 |
| JP | 2008-079465 A | | 4/2008 |
| JP | 2008079465 A | * | 4/2008 |
| JP | 2008-228425 A | | 9/2008 |
| JP | 2008228425 A | * | 9/2008 |
| JP | 2009-024703 A | | 2/2009 |
| JP | 2010-068595 A | | 3/2010 |

OTHER PUBLICATIONS

Official Communication issued in International Patent Application No. PCT/JP2018/034811, dated Dec. 25, 2018.
Ogawa et al., "MOTOR", U.S. Appl. No. 16/637,287, filed Feb. 7, 2020.

* cited by examiner

MOTOR AND METHOD OF MANUFACTURING MOTOR

CROSS REFERENCE TO RELATED APPLICATIONS

This is a U.S. national stage of PCT Application No. PCT/JP2018/036191, filed on Sep. 28, 2018, and priority under 35 U.S.C. § 119(a) and 35 U.S.C. § 365(b) is claimed from Japanese Application No. 2017-188045, filed Sep. 28, 2017, Japanese Application No. 2017-191095, filed on Sep. 29, 2017 and Japanese Application No. 2018-069781, filed on Mar. 30, 2018, the entire contents of which are hereby incorporated herein by reference.

FIELD OF THE INVENTION

The present disclosure relates to a motor and a method of manufacturing the motor.

BACKGROUND

In a related art, a motor having a connecting member (busbar) to which a stator winding (conducting wire) extending from a stator is connected by welding from outside is known.

In a process of connecting the conducting wire extending from a coil to the busbar, position of the conducting wire is likely to shift. That is, since it is difficult to arrange position of the conductive wire with respect to the busbar at a desired position, a process for connecting the busbar and the conducting wire is complicated, so it was difficult to automate the above process.

SUMMARY

A motor according to an example embodiment of the present disclosure includes a rotor including a shaft extending along a central axis, a stator including a coil and opposing the rotor in a radial direction with a gap provided therebetween, and a busbar positioned at one axial-directional side of the stator. The busbar includes a conducting wire-connecting portion connected to a conducting wire extending from the coil. A notch into which the conducting wire is inserted is provided in the conducting wire-connecting portion. An inner circumferential surface of the notch includes a bottom surface opposing an opening side of the notch, a first opposed surface extending from the bottom surface towards the opening, and a second opposed surface extending from the bottom surface towards the opening and opposing the first opposed surface. The first opposed surface includes a first region connected to the bottom surface and a second region connected to the first region and extending to the opening side. A first convex portion protruding towards the second opposed surface is provided on a boundary portion between the first region and the second region. The conducting wire-connecting portion is in contact with the conducting wire in the bottom surface, the second opposed surface and the first region of the first opposed surface.

According to an example embodiment of the present disclosure, a method of manufacturing a motor including a rotor including a shaft extending along a central axis, a stator including a coil and opposing the rotor in a radial direction with a gap, and a busbar positioned at one axial-directional side of the stator, includes holding a conducting wire, which extends from the coil, on the busbar. The holding includes inserting the conducting wire into a notch provided in a conducting wire-connecting portion of the busbar and caulking the conducting wire-connecting portion in a direction in which the notch is closed. An inner circumferential surface of the notch includes a bottom surface opposing an opening side of the notch, a first opposed surface extending from the bottom surface towards the opening, and a second opposed surface extending from the bottom surface towards the opening and opposing the first opposed surface. The first opposed surface includes a first region connected to the bottom surface and a second region connected to the first region and extending to the opening side. A convex portion protruding towards the second opposed surface is provided on a boundary portion between the first region and the second region, the second region before the caulking is inclined in a direction in which the second region extends away from the second opposed surface, as it extends towards the opening side, and the conducting wire-connecting portion after the caulking is in contact with the conducting wire in the bottom surface, the second opposed surface and the first region of the first opposed surface.

According to example embodiments of the present disclosure, motors and methods of manufacturing motors simplify connecting a busbar and a conducting wire.

The above and other elements, features, steps, characteristics and advantages of the present disclosure will become more apparent from the following detailed description of the example embodiments with reference to the attached drawings.

DETAILED DESCRIPTION

Hereinafter, motors according to example embodiments of the present disclosure will be described with reference to the drawings. In addition, in the following drawings, in order to make each structure easy to be understood, a scale, the number, or the like of actual structure may differ from those in each structure.

A Z-axial direction shown appropriately in each drawing is a vertical direction in which a positive side is an upper side and a negative side is a lower side. A central axis J shown appropriately in each drawing is a virtual line which is parallel to the z-axial direction and extends in the vertical direction. In the following description, an axial direction of the central axis J, that is, a direction which is parallel with the vertical direction is simply referred to as "axial direction", a radial direction centered on the central axis J is simply referred to as "radial direction", and a circumferential direction centered on the central axis J is simply referred to as "circumferential direction". In each drawing, the circumferential direction is appropriately indicated by an arrow θ. Furthermore, a positive side of the Z-axial direction in the axial direction is referred to as "upper side", and a negative side of the Z-axial direction in the axial direction is referred to as "lower side". In the example embodiment of the present disclosure, the upper side corresponds to one axial-directional side, and the lower side corresponds to the other axial-directional side. In addition, a side proceeding in a counterclockwise direction when viewed from the upper side to the lower side in the circumferential direction, that is, a side proceeding in the direction of the arrow θ is referred to as "one circumferential-directional side". A side proceeding in a clockwise direction when viewed from the upper side to the lower side in the circumferential direction, that is, a side proceeding in the direction which is opposite to the direction of the arrow θ is referred to as "the other circumferential-directional side".

In addition, the vertical direction, the upper side, and the lower side are only terms for explaining a relative positional relationship between the respective parts, and an actual arrangement relationship may be an arrangement relationship other than the arrangement relationship indicated by these terms.

Figure 1:
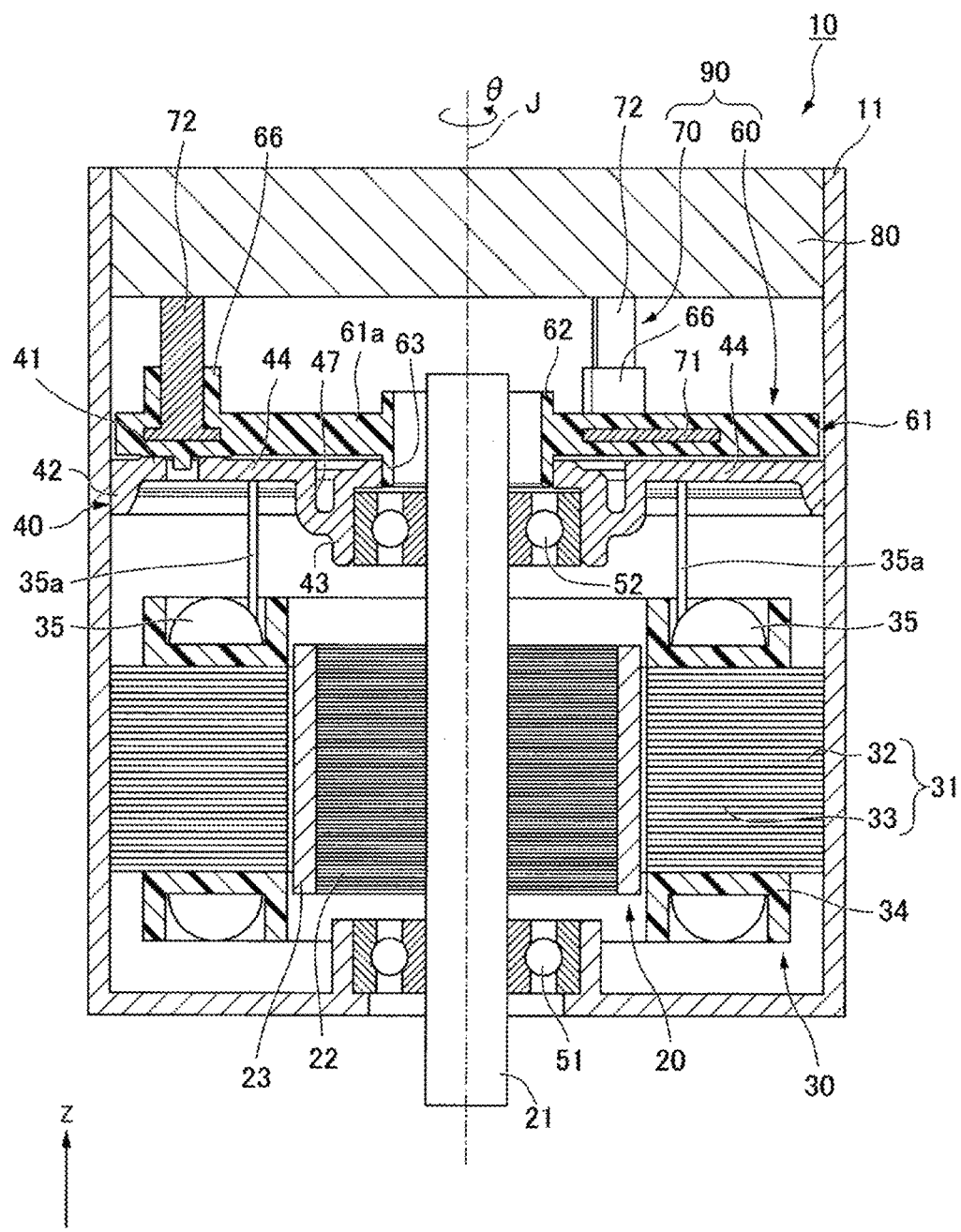
FIG. 1 is a cross-sectional view showing a motor of an example embodiment of the present disclosure.

FIG. 1 is a cross-sectional view of a motor 10 of one example embodiment of the present disclosure. The motor 10 of the example embodiment of the present disclosure is provided with a housing 11, a rotor 20, a pair of bearings 51 and 52, a stator 30, a bearing holder 40, a plurality of busbars 70, a busbar holder 60, and a controller 80. The plurality of busbars 70 and the busbar holder 60 constitute a busbar assembly 90.

The housing 11 accommodates each part of the motor 10. The housing 11 has a cylindrical or substantially cylindrical shape centered on a central axis J. The housing 11 holds the bearing 51 at a lower portion of a lower side thereof.

The rotor 20 has a shaft 21, a rotor core 22, and a magnet 23. The shaft 21 is disposed along the central axis J. The shaft 21 is rotatably supported by the pair of bearings 51 and 52. The rotor core 22 has an annular or substantially annular shape and is fixed to an outer circumferential surface of the shaft 21. The magnet 23 is fixed to an outer circumferential surface of the rotor core 22. The bearing 51 rotatably supports the shaft 21 at a lower side of the rotor core 22. The bearing 52 rotatably supports the shaft 21 on an upper side of the rotor core 22. The bearings 51 and 52 are ball bearings.

The stator 30 faces the rotor 20 with a gap in a radial direction. The stator 30 surrounds the rotor 20 at a radial-directional outer side of the rotor 20. The stator 30 includes a stator core 31, an insulator 34, and a plurality of coils 35. The stator core 31 includes a core back 32 and a plurality of teeth 33.

The plurality of coils 35 are mounted to the plurality of teeth 33, respectively, via the insulator 34. The coil 35 is configured by winding a conducting wire around the teeth 33 via the insulator 34. From each coil 35, a coil lead line (conducting wire) 35a is drawn upward. The coil lead line 35a is a conducting wire extending from the coil 35 and is an end of the conducting wire constituting the coil 35.

The bearing holder 40 is disposed above the stator 30. The bearing holder 40 is made of metal. The bearing holder 40 holds the bearing 52.

As shown in FIG. 1, the controller 80 is disposed above the stator 30, the bearing holder 40, and the busbar assembly 90. The controller 80 is electrically connected to the busbar 70 via an external connecting terminal 72 of the busbar assembly 90. The controller 80 supplies electric power to the coil 35 via the busbar 70. The controller 80 includes a substrate on which an inverter circuit controlling the electric power supplied to the coil 35 is provided, and the like.

Figure 2:
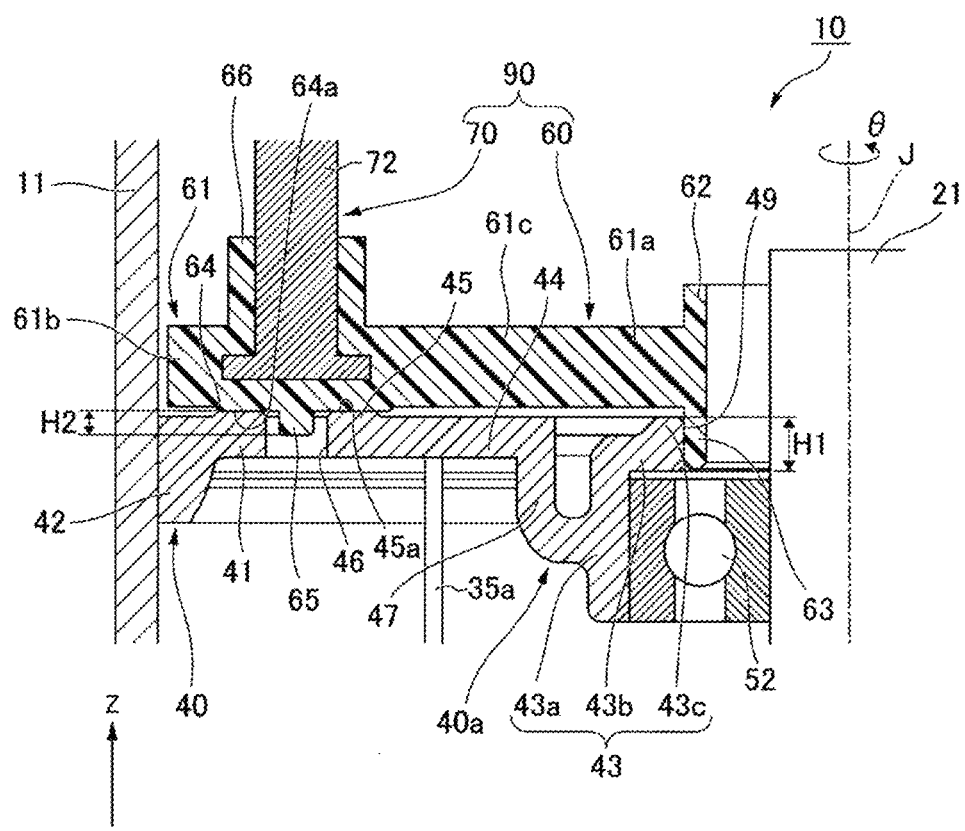
FIG. 2 is a cross-sectional view showing a portion of a motor of an example embodiment of the present disclosure.
Figure 3:
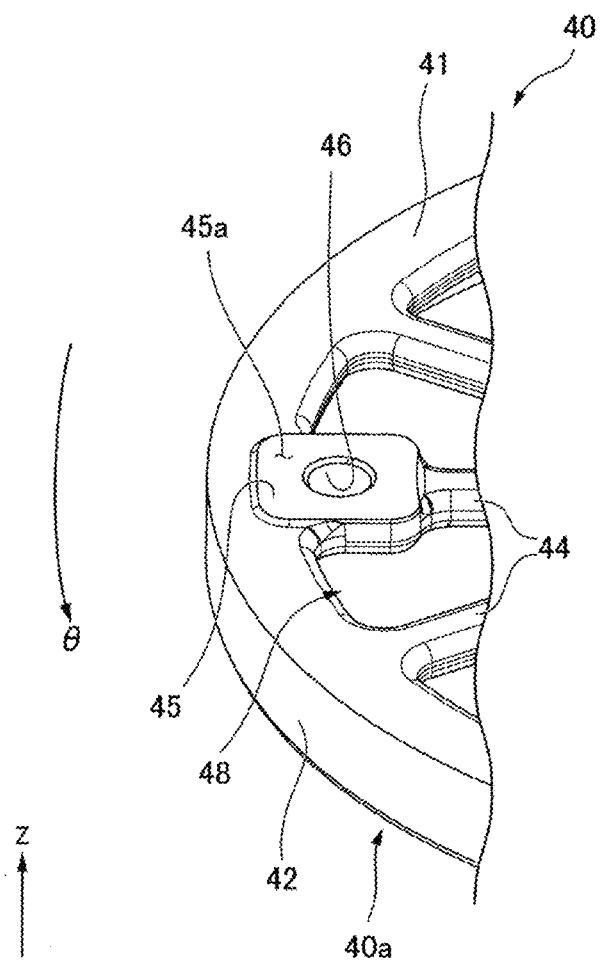
FIG. 3 is a perspective view showing a portion of a bearing holder of an example embodiment of the present disclosure.

FIG. 2 is a cross-sectional view showing a part of the motor of the example embodiment of the present disclosure. FIG. 3 is a perspective view showing a part of the bearing holder of the example embodiment of the present disclosure.

As shown in FIG. 2, the bearing holder 40 includes a first outer annulus 41, a fixed cylinder 42, a first inner annulus 47, a plurality of first connecting parts 44, a bearing holding part 43, and a first protrusion 45. The first outer annulus 41 has an annular plate or substantially annular plate shape centered on the central axis J having a plate face perpendicular to an axial direction. The fixed cylinder 42 has a cylindrical or substantially cylindrical shape that extends downward from a radial-directional outer edge of the first outer annulus 41. An outer circumferential surface of the first outer annulus 41 and an outer circumferential surface of the fixed cylinder 42 are fixed to an inner circumferential surface of the housing 11. The first inner annulus 47 has a cylindrical or substantially cylindrical shape centered on the central axis J. The first inner annulus 47 is disposed on a radial-directional inner side than the first outer annulus 41. A lower end of the first inner annulus 47 is curved radially inward.

As shown in FIGS. 2 and 3, the plurality of first connecting parts 44 extend in the radial direction. The plurality of first connecting parts 44 are arranged at equidistant intervals in a circumferential direction over one turn. For example, the twelve (12) first connecting parts 44 are provided. The plurality of first connecting parts 44 connect a radial-directional inner edge of the first outer annulus 41 and an upper end of the first inner annulus 47.

In the first connecting parts 44, as shown in FIG. 3, each of some first connecting parts 44 has a circumferential width which becomes large in a radial-directional outer portion. For example, each of the three first connecting parts 44 has a circumferential width that is increased at the radial-directional outer portion. These three first connecting parts 44 are arranged at equidistant intervals in the circumferential direction over one turn. A first through-hole 48 is provided between the first connecting parts 44 adjacent to each other the circumferential direction. The first through-hole 48 penetrates the bearing holder 40 in the axial direction. The coil lead line 35a extending from each coil 35 passes through each of the first through-holes 48.

As shown in FIG. 2, the bearing holding part 43 is connected to a radial-directional inner edge of the lower end of the first inner annulus 47. The bearing holding part 43 includes a cylinder 43a, a lid 43b, and an annular protrusion 43c. The cylinder 43a has a cylindrical or substantially cylindrical shape centered on the central axis J. An outer circumferential surface of the bearing 52 is fixed to an inner circumferential surface of the cylinder 43a. Due to the above, the bearing holding part 43 holds the bearing 52. The bearing 52 is disposed farther in the lower direction than the lid 43b.

The lid 43b has an annular or substantially annular shape that protrudes inward in the radial direction from an upper end of the cylinder 43a. The lid 43b covers an upper side of an outer ring of the bearing 52. The annular protrusion 43c protrudes upward from a radial-directional inner edge of the lid 43b. The annular protrusion 43c has an annular or substantially annular shape centered on the central axis J. An inner circumferential surface of the annular protrusion 43c is connected to an upper end of an inner circumferential surface of the lid 43b. The inner circumferential surface of the annular protrusion 43c and the inner circumferential surface of the lid 43b are disposed at the same position in the radial direction.

In the example embodiment of the present disclosure, a first central hole 49 that penetrates the bearing holder 40 in the axial direction is constituted by the lid 43b and the annular protrusion 43c. An inner circumferential surface of the first central hole 49 is constituted by the inner circumferential surface of the lid 43b and the inner circumferential surface of the annular protrusion 43c. The first central hole 49 has a circular or substantially circular shape centered on the central axis J when viewed along the axial direction.

In the example embodiment of the present disclosure, a bearing holder main body 40a is constituted by the first outer annulus 41, the fixed cylinder 42, the first inner annulus 47, the plurality of first connecting parts 44, and the bearing holding part 43.

As shown in FIG. 3, the first protrusion 45 protrudes upward from the bearing holder main body 40a. The first protrusion 45 is provided across the first outer annulus 41 and the first connecting part 44. In the first connecting parts 44, each first protrusion 45 is provided on the first connecting part 44 whose the above-described circumferential width becomes large in the radial-directional outer side. That is, in the example embodiment of the present disclosure, the three first protrusions 45 are provided and arranged at equidistant intervals in the circumferential direction over one turn.

An upper face of the first protrusion 45 is a lower contact face 45a. The lower contact face 45a is a flat face perpendicular to the axial direction. A shape of the lower contact face 45a viewed from an upper side is a substantially square shape with rounded corners. The lower contact face 45a is a portion located at the uppermost side of the bearing holder 40.

One first protrusion 45 of the plurality of first protrusions 45 has a hole 46 which is concaved in the axial direction. The hole 46 is concaved downward from the lower contact face 45a. The hole 46 is opened to the upper face of the first protrusion 45. A shape of the hole 46 viewed from the upper side is a circular or substantially circular shape. The hole 46 is disposed at a center of the first protrusion 45. As shown in FIG. 2, the hole 46 penetrates the bearing holder 40 in the axial direction from the lower contact face 45a to a lower face of the first connecting part 44.

As shown in FIG. 1, the busbar assembly 90 is disposed above the stator 30 and the bearing holder 40. The busbar assembly 90 includes the plurality of busbars 70 and the busbar holder 60. That is, the plurality of busbars 70 and the busbar holder 60 are located above (one axial-directional side) the stator 30 and the bearing holder 40. The busbar holder 60 supports the plurality of busbars 70. The busbar holder 60 is made of resin.

As shown in FIG. 2, the busbar holder 60 includes a busbar holder main body 61, an upper central cylinder 62, a lower central cylinder 63, a second protrusion 64, a fitting convex portion 65, and a terminal supporting part 66.

Figure 4:
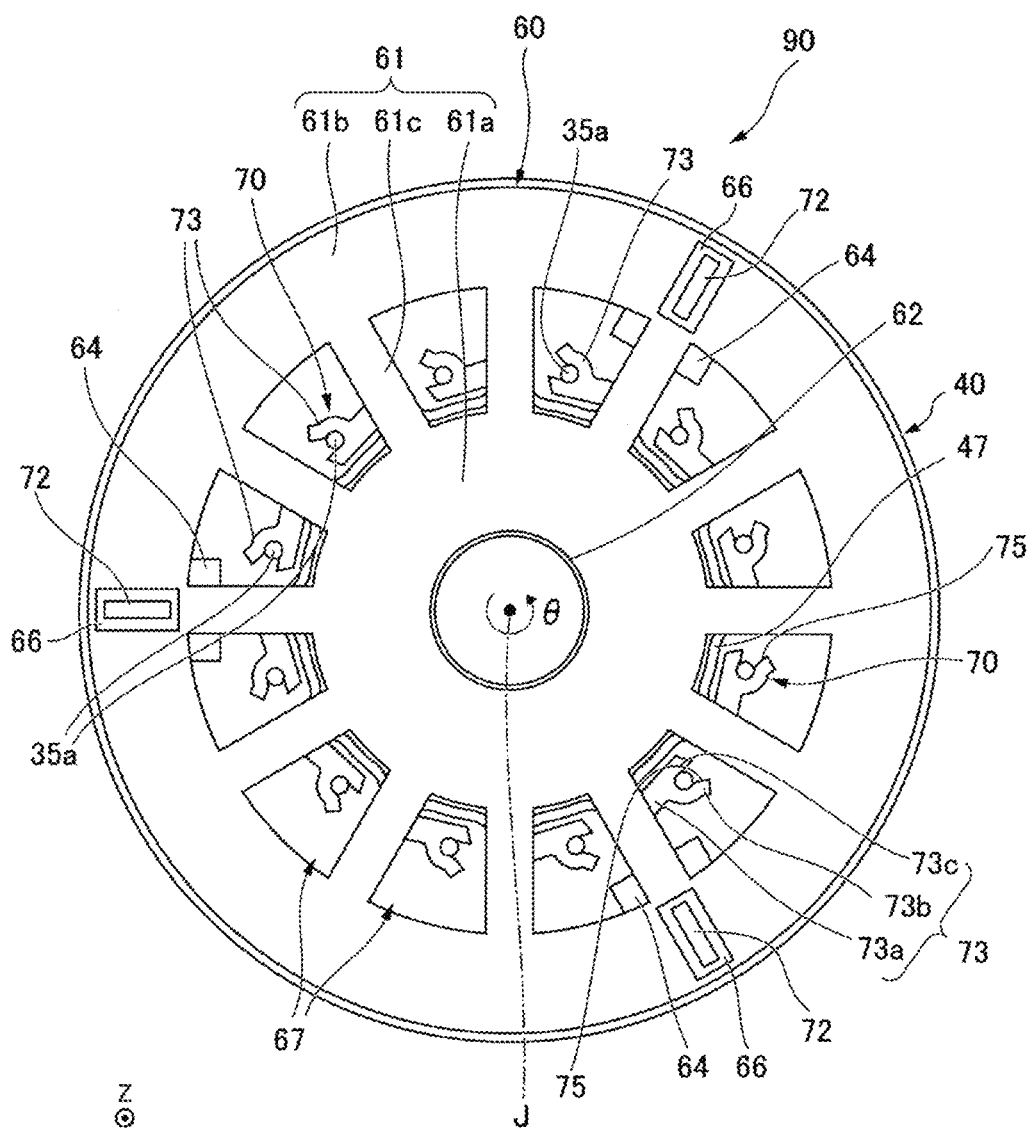
FIG. 4 is a view of a busbar assembly and a bearing holder of an example embodiment of the present disclosure viewed from above.
Figure 5:
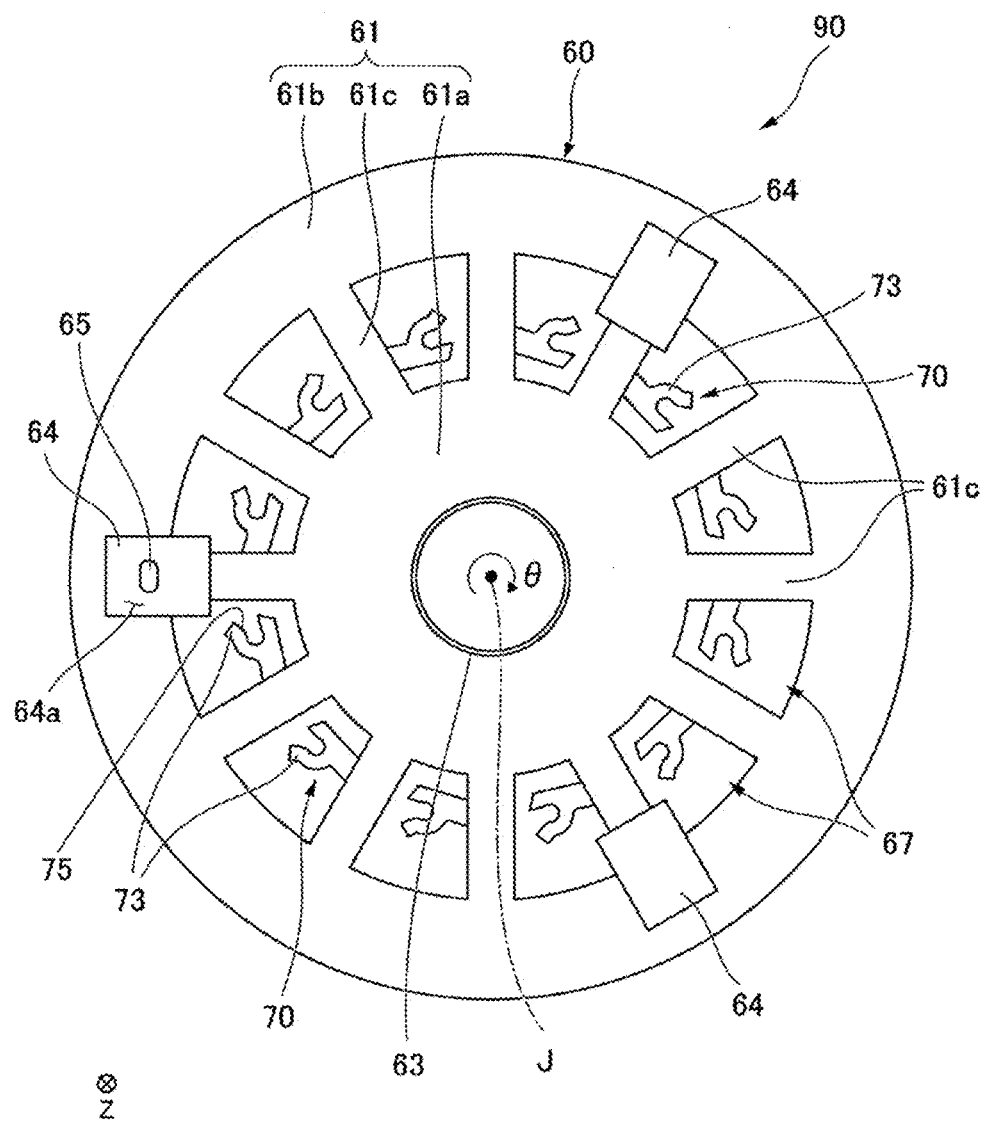
FIG. 5 is a view of a busbar assembly of an example embodiment of the present disclosure viewed from below.

FIG. 4 is a view of the busbar assembly 90 and the bearing holder 40 of the example embodiment of the present disclosure viewed from above. FIG. 5 is a view of the busbar assembly 90 and the bearing holder 40 of the example embodiment of the present disclosure viewed from below.

As shown in FIG. 4, the busbar holder main body 61 includes a second inner annulus 61a, a second outer annulus 61b, and a plurality of second connecting parts 61c. The second inner annulus 61a and the second outer annulus 61b have annular or substantially annular shapes centered on the central axis J. When viewed along the axial direction, the second outer annulus 61b surrounds the second inner annulus 61a on a radial-directional outer side of the second inner annulus 61a. As shown in FIG. 2, the second inner annulus 61a is disposed above the bearing holding part 43. The second outer annulus 61b is disposed above the first outer annulus 41. In the example embodiment of the present disclosure, the second inner annulus 61a and the second outer annulus 61b are disposed at the same position in the axial direction. An outer diameter of the second outer annulus 61b is smaller than an outer diameter of the bearing holder 40.

As shown in FIG. 4, the plurality of second connecting parts 61c extend in the radial direction. The plurality of second connecting parts 61c are arranged at equidistant intervals in the circumferential direction over one turn. In FIG. 4, for example, twelve (12) second connecting parts 61c are provided. The plurality of second connecting parts 61c connect the second outer annulus 61b and the second inner annulus 61a. The second connecting part 61c overlaps the first connecting part 44 when viewed along the axial direction. Each second through-hole 67 is provided between the second connecting parts 61c adjacent to each other in the circumferential direction. The second through-hole 67 penetrates the busbar holder 60 in the axial direction. The second through-hole 67 overlaps the first through-hole 48 when viewed along the axial direction. The coil lead line 35a extending upward through the first through-hole 48 is inserted into each of the second through-holes 67.

As shown in FIG. 2, the upper central cylinder 62 has a cylindrical or substantially cylindrical shape which is centered on the central axis J and protrudes upward from a radial-directional inner edge of the second inner annulus 61a. The lower center cylinder 63 has a cylindrical or substantially cylindrical shape which is centered on the central axis J and protrudes downward from the radial-directional inner edge of the second inner annulus 61a.

The inside of the upper central cylinder 62 and the inside of the lower central cylinder 63 are connected to each other in the axial direction and penetrate the busbar holder 60 in the axial direction. An upper end of the shaft 21 passes through the inside of the upper central cylinder 62 and the inside of the lower central cylinder 63. A lower end of the lower central cylinder 63 is a part located at the lowermost side in the busbar assembly 90. The lower central cylinder 63 is fitted into the first central hole 49.

The second protrusion 64 protrudes downward from the busbar holder main body 61. As shown in FIG. 5, the second protrusion 64 is provided over the second outer annulus 61b and the second connecting part 61c. The plurality of second protrusions 64 are provided. The plurality of protrusions 64 are arranged at equidistant intervals in the circumferential direction over one turn. In FIG. 5, for example, three second protrusions 64 are provided. As shown in FIG. 2, the first protrusion 45 and the second protrusion 64 overlap each other when viewed along the axial direction.

A lower face of the second protrusion 64 is an upper contact face 64a. The upper contact face 64a is a flat face perpendicular to the axial direction. As shown in FIG. 2, the upper contact face 64a is disposed above the lower end of the lower central cylinder 63. As shown in FIG. 5, the shape of the upper contact face 64a viewed from below is a rectangular or substantially rectangular shape which is elongated in the radial direction.

Figure 6:
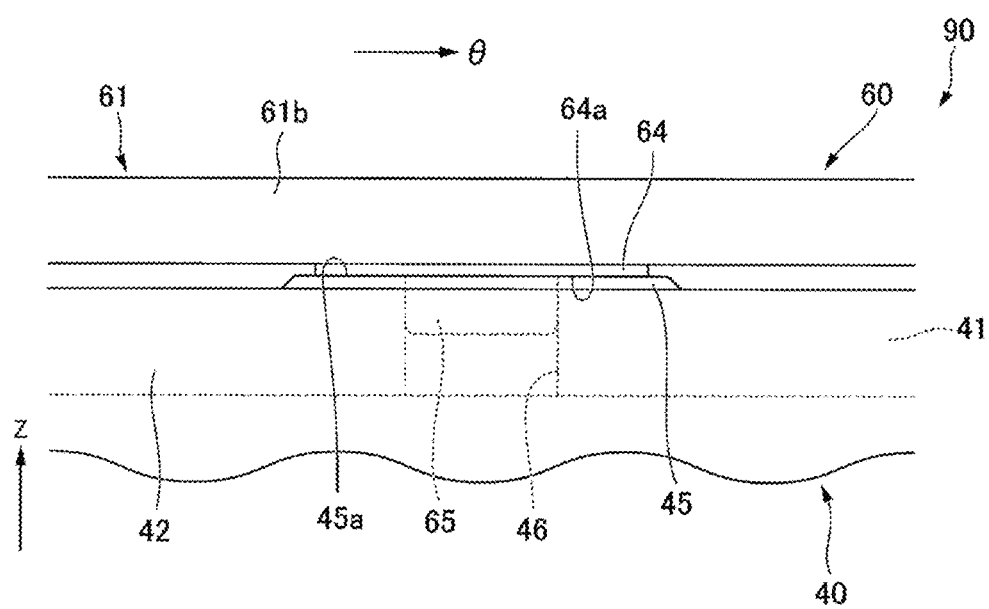
FIG. 6 is a view of a portion of the busbar assembly and a portion of the bearing holder of an example embodiment of the present disclosure viewed from a radial-directional outer side.

FIG. 6 is a view of a part of the busbar assembly 90 and a part of the bearing holder 40 of the example embodiment of the present disclosure viewed from a radial-directional outer side. As shown in FIG. 6, the lower contact face 45a of each first protrusion 45 and the upper contact face 64a of each second protrusion 64 are in contact with each other. Due to the above, a location of the busbar assembly 90 in the axial direction with respect to the bearing holder 40 is determined.

In the example embodiment of the present disclosure, since the lower contact face 45a and the upper contact face 64a are flat faces perpendicular to the axial direction such that the busbar assembly 90 is restrained from being disposed with the busbar assembly 90 being tilted against the bearing holder 40. Furthermore, the busbar assembly 90 may be stably supported by the bearing holder 40.

The fitting convex portion 65 is provided on one second protrusion 64 of the plurality of second protrusion 64. The fitting convex portion 65 has a columnar or substantially columnar shape protruding downward from the upper contact face 64a. As shown in FIG. 5, a shape of the fitting convex portion 65 viewed from below is a rectangular or substantially rectangular shape which has rounded corners and is elongated in a direction perpendicular to both the radial direction and the axial direction. A lower face of the fitting convex portion 65 is a flat face perpendicular to the axial direction. As shown in FIG. 6, the fitting convex portion 65 is fitted into the hole 46. Due to the above, a position of the busbar assembly 90 in the circumferential direction with respect to the bearing holder 40 is determined, so a relative position in the circumferential direction between the busbar assembly 90 and the bearing holder 40 may be suppressed from being deviated.

In the dimensions of the fitting convex portion 65 in a direction perpendicular to the axial direction, a longitudinal-directional dimension may be substantially the same as an inner diameter of the hole 46, and may be slightly smaller than the inner diameter of the hole 46. A longitudinal direction of the fitting convex portion 65 is a left-right direction in FIG. 6.

A lower end of the fitting convex portion 65 is disposed above a lower end of the hole 46. As shown in FIG. 2, the lower end of the fitting convex portion 65 is disposed above the lower end of the lower central cylinder 63. An axial-directional dimension H2 of a portion of the fitting convex portion 65, which is fitted into the hole 46, is smaller than an axial-directional dimension H1 of a portion of the lower central cylinder 63, which is fitted into the first central hole 49. The dimension H1 corresponds to an axial distance between an upper end of the first central hole 49 and the lower end of the lower central cylinder 63. The dimension H2 corresponds to an axial distance between an upper end of the hole 46 and the lower end of the fitting convex portion 65. In the example embodiment of the present disclosure, the entire fitting convex portion 65 is fitted into the hole 46. For that reason, the dimension H2 corresponds to an axial-directional dimension of the fitting convex portion 65.

As shown in FIG. 2, the terminal supporting part 66 protrudes upward from the busbar holder main body 61. As shown in FIG. 4, the plurality of terminal supporting parts 66 are provided. The plurality of terminal supporting parts 66 are arranged at equidistant intervals in the circumferential direction over one turn. In FIG. 4, for example, three terminal supporting parts 66 are provided. Each of the three terminal supporting parts 66 is disposed at a position overlapping each of the three second protrusions 64 when viewed along the axial direction.

As shown in FIGS. 1 and 4, each of the plurality of busbars 70 includes a busbar main body 71, the external connecting terminal 72, and a conducting wire-connecting portion 73. In the example embodiment of the present disclosure, for example, three busbars 70 are provided. Each of the three busbars 70 is provided with one external connecting terminal 72 and four conducting wire-connecting portions 73. That is, in the example embodiment of the present disclosure, a total of three external connecting terminals are provided, and a total of 12 conducting wire-connecting portions 73 are provided.

As shown in FIG. 1, the busbar main body 71 is embedded in the busbar holder 60. Due to the above, the busbar holder 60 holds the busbar 70. The busbar main body 71 is a plate or substantially plate shape whose plate face is perpendicular to the axial direction. The busbar main body 71 extends along a plane perpendicular to the axial direction. The external connecting terminal 72 is connected to the busbar main body 71. The external connecting terminal 72 protrudes upward from the busbar holder 60. The external connecting terminal 72 is supported by the terminal supporting part 66. The external connecting terminal 72 is connected to the controller 80.

As shown in FIG. 4, the conducting wire-connecting portion 73 is connected to the coil lead line 35a. The conducting wire-connecting portion 73 has a plate or substantially plate shape along a plane perpendicular to the axial direction. Accordingly, a plate-thicknesswise direction of the conducting wire-connecting portion 73 coincides with the axial direction. The conducting wire-connecting portion 73 is connected to the busbar main body 71, protrudes from the second connecting part 61c to one circumferential-directional side, and is exposed to the outside of the busbar holder 60. The conducting wire-connecting portion 73 is disposed in the second through-hole 67. The conducting wire-connecting portion 73 has a substantial U-shape which is opened to one circumferential-direction side.

The conducting wire-connecting portion 73 includes a base 73a and a pair of arms (a first arm 73b and a second arm 73c).

The base 73a is a portion connected to the busbar main body 71, and protrudes from the second connecting part 61c to one circumferential-directional side. The first arm 73b and the second arm 73c extend from the base 73a to one circumferential-directional side. The first arm 73b and the second arm 73c face each other in the radial direction with a gap. The first arm 73b has a wave or substantially wave shape when viewed along the axial direction.

A notch 75 extending from a front end of the conducting wire-connecting portion 73 in the radial direction is formed between the first arm 73b and the second arm 73c. That is, the notch 75 is provided on the conducting wire-connecting portion 73. The notch 75 is opened to one circumferential-directional side. The coil lead line 35a is inserted into the notch 75. In the present specification, the notch 75 may be anything that penetrates in the axial direction and extends in one direction, and may be, for example, a groove.

A method of manufacturing the motor 10 includes a holding process of holding the coil lead line 35a on the busbar 70. The holding process includes an inserting process of inserting the coil lead line 35a into the notch 75 and a caulking process of caulking the conducting wire-connecting portion 73 in a direction in which the notch 75 is closed.

Figure 7:
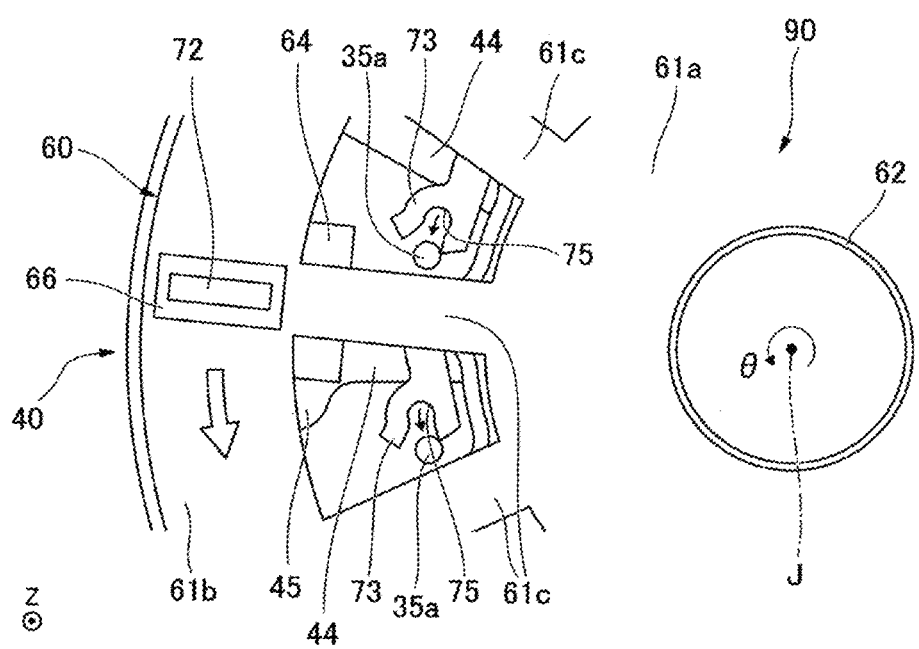
FIG. 7 is a view showing a part of a procedure of attaching a busbar assembly of an example embodiment of the present disclosure.
Figure 8:
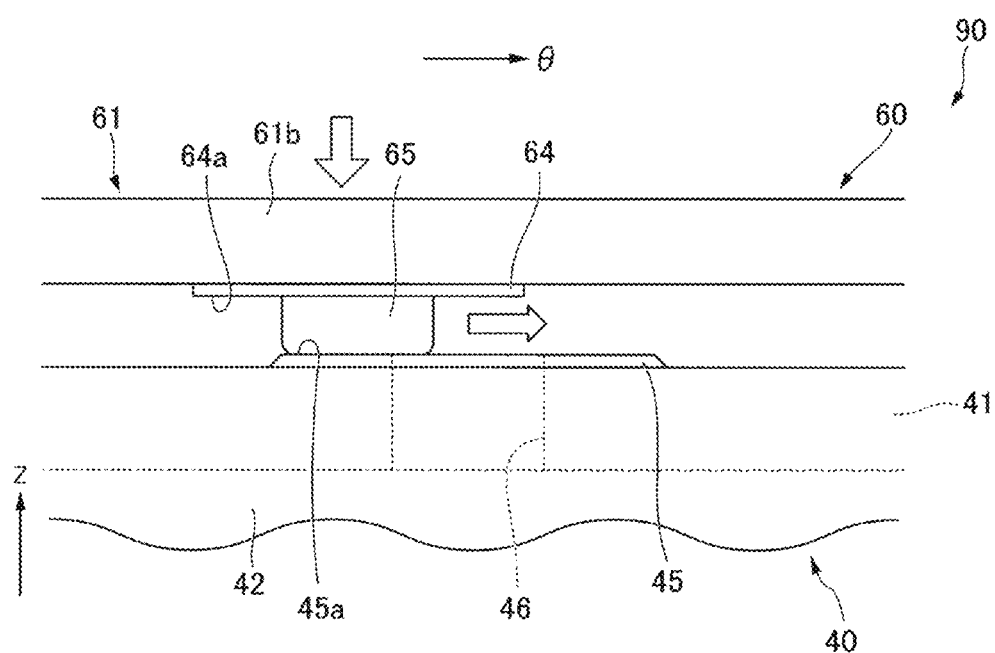
FIG. 8 is a view showing a portion of a procedure of attaching a busbar assembly of an example embodiment of the present disclosure.

The inserting process will be described. FIGS. 7 and 8 are views showing a part of a procedure for attaching the busbar assembly 90 of the example embodiment of the present disclosure. As shown in FIG. 7, an operator first roughly positions the busbar assembly 90 with respect to the bearing holder 40 at a side in the circumferential direction which is opposite to a side where the notch 75 of the conducting wire-connecting portion 73 is opened, that is, at a position which is slightly shifted to the other circumferential-directional side. Then, as shown in FIG. 8, the operator brings the busbar assembly 90 close to the bearing holder from the upper side to bring the lower face of the fitting convex portion 65 into contact with the lower contact face 45a. At this time, the coil lead line 35a extending upward through the first through-hole 48 is inserted into the second through-hole 67 and becomes in a state in which it faces the conducting wire-connecting portion 73 in the circumferential direction.

Further, the axial-directional dimension H1 of the portion of the lower central cylinder 63 which is fitted into the first central hole 49 is larger than the axial-directional dimension H2 of the portion of the fitting convex portion 65 which is fitted into the hole 46. For this reason, when the lower face of the fitting convex portion 65 comes into contact with the lower contact face 45a where the hole 46 is opened, the lower central cylinder 63 becomes in a state in which the lower end thereof is fitted into the first central hole 49. As a result, the busbar assembly 90 becomes in a state in which it is rotatably supported about the central axis J with respect to the bearing holder 40 by fitting the lower central cylinder 63 into the first central hole 49.

Next, the operator rotates the busbar assembly 90 in the circumferential direction while applying a downward force on the busbar assembly 90. More specifically, as shown in FIG. 7, the operator rotates the busbar assembly 90 in the circumferential direction towards a side to which the notch 75 of the conducting wire-connecting portion 73 is opened, that is, one circumferential-directional side. Due to the above, as shown in FIG. 8, the lower face of the fitting convex portion 65 is moved in the circumferential direction while sliding on the lower contact face 45a. In addition, when the fitting convex portion 65 is moved to the position at which the fitting convex portion 65 overlaps the hole 46 in an axial direction, the fitting convex portion 65 is fitted into the hole 46, and the busbar assembly 90 is moved downward until the upper contact face 64a comes into contact with the lower contact face 45a.

Due to the above, the operator may determine position of the busbar assembly 90 with respect to the bearing holder 40 in the axial direction and the circumferential direction and attach it to the bearing holder 40. Since position of the busbar assembly 90 with respect to the bearing holder 40 in the circumferential direction may be determined, positioning of the external connecting terminal 72 in the circumferential direction may be achieved. Due to the above, it is easy to connect the external connecting terminal 72 to the controller 80. Further, in a state where the busbar assembly 90 is positioned in the circumferential direction with respect to the bearing holder 40, the coil lead line 35a is inserted into the notch 75 of the conducting wire-connecting portion 73. Due to the above, the position of the coil lead line 35a may be adjusted to a position where it can be connected to the busbar 70.

In the example embodiment of the present disclosure, one busbar 70 has the plurality of conducting wire-connecting portions 73. In addition, the motor 10 is provided with the plurality of busbars 70. All of the opening directions of the notches 75 of the plurality of conducting wire-connecting portions 73 provided on the plurality of busbars 70, respectively, are directed towards one circumferential-directional side. Therefore, as the inserting process, by rotating the busbar assembly 90 (that is, the busbar 70 and the busbar holder 60) about the central axis J, the coil lead lines 35a may be inserted into the notches 75 of the plurality of conducting wire-connecting portions 73, respectively. According to the example embodiment of the present disclosure, the coil lead line 35a may be easily inserted into the notch 75 of conducting wire-connecting portion 73, so the coil lead line 35a may be easily connected to the busbar 70.

Further, the smaller the motor 10 is, the smaller an inner portion of the notch 75 of the conducting wire-connecting portion 73 becomes. For that reason, as the motor 10 becomes smaller, it becomes more difficult to bring the busbar assembly 90 closer to bearing holder 40 and to directly insert the coil lead line 35a into the notch 75. Therefore, the above-described effect that the coil lead line 35a may be easily inserted into the conducting wire-connecting portion 73 is obtained particularly usefully from a relatively small motor.

Furthermore, according to the example embodiment of the present disclosure, the upper face of the first protrusion 45 is the lower contact face 45a which is a flat face, and the hole 46 is opened to the lower contact face 45a. For that reason, by pressing and sliding the fitting convex portion 65 against and on the lower contact face 45a, the fitting convex portion 65 may be fitted into the hole 46. Due to the above, when the busbar assembly 90 is rotated, it becomes easy to fit the fitting convex portion 65 into the hole 46. Moreover, it is easy to reduce friction between the fitting convex portion 65 and the bearing holder 40, and to easily rotate the busbar assembly 90 in the circumferential direction. Moreover, damage to the fitting convex portion 65 may be suppressed.

In addition, according to the example embodiment of the present disclosure, the lower face of the fitting convex portion 65 is a flat face perpendicular to the axial direction. For this reason, when the fitting convex portion 65 is pressed against the lower contact face 45a, the fitting convex portion 65 and the lower contact face 45a may be stably brought into contact with each other. Due to the above, it is easy to stably rotate the busbar assembly 90 with respect to the bearing holder 40.

Figure 9:
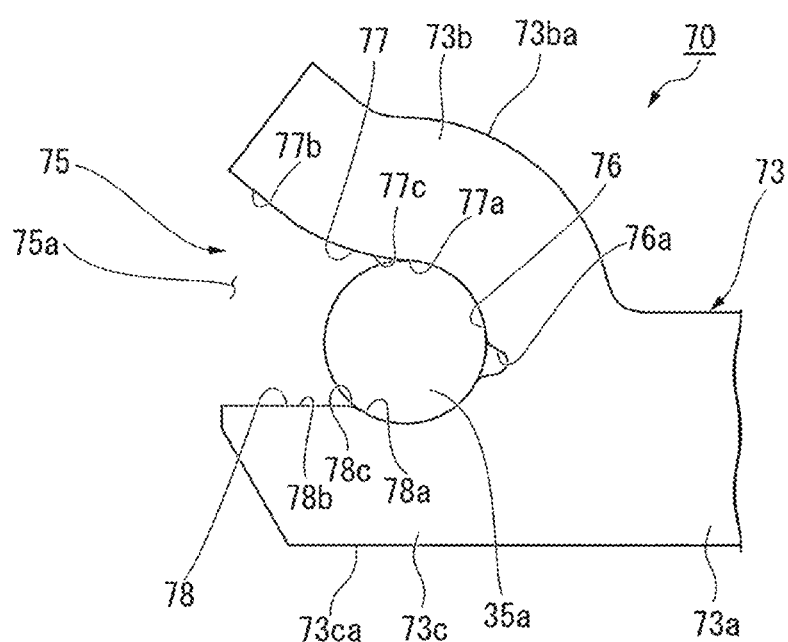
FIG. 9 is a view showing a state of a conducting wire-connecting portion of an example embodiment of the present disclosure before a caulking process.
Figure 10:
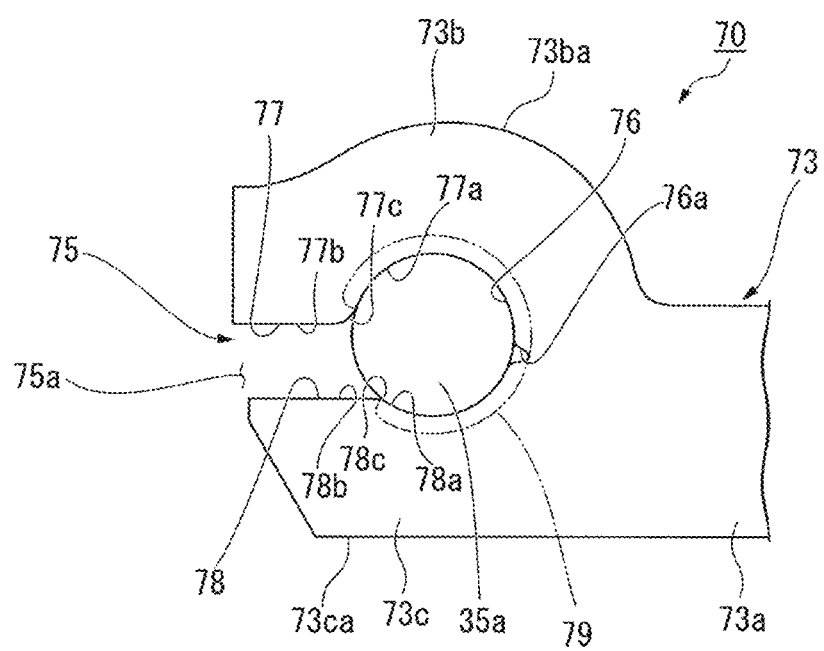
FIG. 10 is a view showing a state of the conducting wire-connecting portion of an example embodiment of the present disclosure after the caulking process.

Next, the caulking process is described. FIGS. 9 and 10 are enlarged views of the conducting wire-connecting portion 73. In addition, FIG. 9 is a view showing the conducting wire-connecting portion 73 after the inserting process and before the caulking process, and FIG. 10 is a view showing the conducting wire-connecting portion 73 after the caulking process.

As shown in FIG. 10, in a state where the coil lead line 35a is inserted into the notch 75, the first arm 73b and the second arm 73c are close to each other to be caulked in a direction in which the notch 75 is closed. Due to the above, the conducting wire-connecting portion 73 pinches the coil lead line 35a between the first arm 73b and the second arm 73c, and holds the coil lead line 35a.

The conducting wire-connecting portion 73 after the caulking process and the coil lead line 35a are fixed to each other by a jointing means such as welding or the like. Due to the above, the conducting wire-connecting portion 73 is connected to the coil lead line 35a. In addition, the busbar 70 is electrically connected to the coil 35. That is, the method of manufacturing the motor 10 includes a jointing process for jointing the busbar 70 and the coil lead line 35a held by the busbar 70.

The jointing process is preferably a welding process. As shown in FIG. 10, when a welding process is performed as the jointing process, a welding section 79 is provided on an interface between an inner circumferential surface of the notch 75 and an outer circumferential surface of the coil lead line 35a.

In addition, the jointing process is more preferably a laser welding process. By performing the laser welding process as the jointing process, a jointing portion between the conducting wire-connecting portion 73 and the coil lead line 35a may be locally heated to a high temperature at high speed. For this reason, it is possible to shorten a tact time required for the jointing process. In addition, by performing the laser welding as the jointing process, the uniform welding section 79 may be formed along the outer circumferential surface of the coil lead line 35a, so it is possible to reduce a resistance value of jointing interface between the busbar 70 and the coil lead line 35a. Furthermore, a resistance welding or a TIG (tungsten inert gas) welding may be employed as the jointing means for the conducting wire-connecting portion 73 and the coil lead line 35a.

As shown in FIGS. 9 and 10, the inner circumferential surface of the notch 75 of the conducting wire-connecting portion 73 before the caulking process and the after the caulking process has a bottom surface 76, a first opposed surface 77, and a second opposed surface 78.

The bottom surface 76 faces an opening 75a side of the notch 75. In this specification, the opening 75a side means a side opened in the direction in which the notch 75 extends. More specifically, the opening 75a side is a left side of page in each of FIGS. 9 and 10. Each of the first opposed surface 77 and the second opposed surface 78 extends from the bottom surface 76 towards the opening 75a. The first opposed surface 77 and the second opposed surface 78 face each other. That is, the first opposed surface 77 faces the second opposed surface 78. In addition, the second opposed surface 78 faces the first opposed surface 77.

The bottom surface 76 is in contact with the outer circumferential surface of the coil lead line 35a in a state where the coil lead line 35a is inserted into the notch 75. The bottom surface 76 has a semicircular or substantially semicircular shape centered on the coil lead line 35a when viewed in the axial direction. That is, the bottom surface 76 is curved along the outer circumferential surface of the coil lead line 35a. For this reason, a large contact area between the bottom surface 76 and the coil lead line 35a may be secured, so it is possible to reduce the resistance value of jointing interface between the busbar 70 and the coil lead line 35a. When the welding process is performed as the jointing process after the caulking process, it is possible to form the uniform welding section 79 on the outer circumferential surface of the coil lead line 35a.

The bottom surface 76 is provided with a concavity portion 76a formed therein and extending to a side opposite to the opening 75a of the notch 75. In other drawings except for FIGS. 9 and 10, the illustration of the concavity portion 76a is omitted in order to prevent the drawings from becoming complicated.

As shown in FIGS. 9 and 10, before and after the caulking process, a width of the concavity portion 76a becomes narrower. By providing the concavity portion 76a, in the course of the caulking process, the bottom surface is deformed in a direction in which the concavity portion 76a is closed, so the bottom surface may be refrained from being gotten away from the outer circumferential surface of the coil lead line 35a. For this reason, the inner circumferential surface of the notch 75 may come into close contact with the outer circumferential surface of the coil lead line 35a such that it is possible to reduce the resistance value of jointing interface between the busbar 70 and the coil lead line 35a. When the welding process is performed as the jointing process after the caulking process, it is possible to form the uniform welding section 79 on the outer circumferential surface of the coil lead line 35a.

The first opposed surface 77 is a part of face of the first arm 73b opposing the notch 75 side. The first opposed surface 77 has a first region 77a and a second region 77b. The first region 77a is connected to the bottom surface 76. The second region 77b is connected to the first region 77a and extends toward the opening 75a side. In addition, a first convex portion 77c protruding towards the second opposed surface 78 side is provided on a boundary portion between the first region 77a and the second region 77b.

As shown in FIG. 9, the first region 77a after the inserting process and before the caulking process is not in contact with the coil lead line 35a. For this reason, when the coil lead line 35a is inserted into the notch 75 to bring the coil lead line 35a into contact with the bottom surface 76, the first region 77a does not hinder insertion of the coil lead line 35a, so it is possible to easily perform the inserting process.

As shown in FIG. 10, the first region 77a is displaced by the caulking process to face the bottom surface 76. Due to the above, the first region 77a comes into contact with the coil lead line 35a. Moreover, the first region 77a after the caulking process is curved along the outer circumferential surface of the coil lead line 35a so as to be smoothly connected from the bottom surface 76. For this reason, a large contact area between the notch 75 and the coil lead line 35a may be secured, and it is possible to reduce the resistance value of jointing interface between the busbar 70 and the coil lead line 35a.

As shown in FIG. 9, the second region 77b before the caulking process is inclined in a direction in which the second region is away from the second opposed surface 78, as it is directed towards the opening 75a side. For this reason, the notch 75 has the widest opening width at the opening end. When the coil lead line 35a is inserted from the opening 75a of the notch 75, the inserting process is facilitated.

As shown in FIG. 10, the second region 77b after the caulking process extends substantially in parallel with the second opposed surface 78 opposing the second region 77b. That is, a distance between the second region 77b after the caulking process and the second opposed surface 78 is substantially uniform. Furthermore, the distance between the second region 77b after the caulking process and the second opposed surface 78 is smaller than a wire diameter of the coil lead line 35a. For this reason, it may be suppressed that the coil lead line 35a is deviated from the notch 75. In the example embodiment of the present disclosure, a gap is provided between the second region 77b and the second opposed surface 78. However, the second region 77b and the second opposed surface 78 may be in contact with each other.

As shown in FIGS. 9 and 10, the first convex portion 77c protrudes towards the second opposed surface 78 to smoothly connect the first region 77a and the second region 77b. In the bottom surface 76, in addition, the notch 75 is concaved in a concavity shape. For this reason, the face of the first arm 73b opposing the notch 75 side, which is obtained by combining a part of the bottom surface 76 and the entire first opposed surface 77, is curved in a wave shape.

As shown in FIG. 9, a distance between a front end of the first convex portion 77c before the caulking process and the second opposed surface 78 is larger than the wire diameter of the coil lead line 35a. For this reason, even when the coil lead line 35a is inserted from the opening 75a of the notch 75 in the inserting process, the first convex portion 77c does not hinder the insertion of the coil lead line 35a into the notch 75.

As shown in FIG. 10, the first convex portion 77c after the caulking process presses the coil lead line 35a against the bottom surface 76. According to the example embodiment of the present disclosure, by providing the first convex portion 77c on the first opposed surface 77, in the process of deforming the first opposed surface 77 by the caulking process, the first convex portion 77c presses the coil lead line 35a against the bottom surface 76 to promote a close contact between the coil lead line 35a and the bottom surface 76. Due to the above, it may be suppressed that a gap is generated between the inner circumferential surface of the notch 75 after the caulking process and the coil lead line 35a.

According to the example embodiment of the present disclosure, by allowing the first convex portion 77c to press the coil lead line 35a against the bottom surface 76, positioning of the coil lead line 35a may be performed. After the inserting process and before the caulking process, the coil lead line 35a tends to be out of position within the notch 75. According to the example embodiment of the present disclosure, even when a position of the coil lead line 35a is shifted in a direction in which the coil lead line is away from the bottom surface 76 within the notch 75, positioning of the coil lead line 35a may be performed by the first convex portion 77c.

As shown in FIGS. 9 and 10, the second opposed surface 78 is a part of a face of the second arm 73c opposing the notch 75 side. The second opposed surface 78 has a third region 78a and a fourth region 78b. The third region 78a is connected to the bottom surface 76. The fourth region 78b is connected to the third region 78a and extends towards the opening 75a side. In addition, a second convex portion 78c protruding towards the first opposed surface 77 side is provided at a boundary portion between the third region 78a and the fourth region 78b.

The third region 78a is curved along the outer circumferential surface of the coil lead line 35a so as to be smoothly connected from the bottom surface 76. For this reason, a large contact area between the notch 75 and the coil lead line 35a may be secured, and it is possible to reduce the resistance value of jointing interface between the busbar 70 and the coil lead line 35a.

The fourth region 78b extends linearly towards the opening 75a side. As shown in FIG. 10, the fourth region 78b is a region opposing the second region 77b with a gap after the caulking process. The fourth region 78b after the caulking process extends substantially in parallel with the second region 77b.

As shown in FIGS. 9 and 10, the coil lead line 35a which is in contact with the bottom surface 76 is caught on the second convex portion 78c. For this reason, in the caulking process, it is suppressed that the coil lead line 35a is deviated from the notch 75. That is, according to the example embodiment of the present disclosure, the second convex portion 78c positions the coil lead line 35 inside the notch 75.

As shown in FIG. 10, the conducting wire-connecting portion 73 of the example embodiment of the present disclosure after the caulking process is in contact with the coil lead line 35a in the bottom surface 76, the second opposed surface 78, and the first region 77a of the first opposed surface 77. Due to the above, the coil lead line 35a is pressed against the bottom surface 76 by the first region 77a, positioning of the coil lead line 35a in the notch 75 may be easily achieved. Moreover, the second opposed surface 78 is in contact with the coil lead line 35a in the third region 78a. For this reason, in the caulking process, it is possible to prevent the coil lead line 35a pressed against the bottom surface 76 side by the first region 77a from being deviated from the opening 75a of the notch 75.

According to the example embodiment of the present disclosure, the conducting wire-connecting portion 73 has a plate or substantially plate shape along a plane perpendicular to the axial direction. Therefore, a shape of the inner circumferential surface of the notch 75 may be cheaply formed by an easy manufacturing process using a press working.

The conducting wire-connecting portion 73 has a first outer circumferential surface 73ba located on a side opposite to the first opposed surface 77 and a second outer circumferential surface 73ca located on a side opposite to the second opposed surface 78. The first outer circumferential surface 73ba is one face of the first arm 73b that faces a side opposite to the notch 75. Similarly, the second outer circumferential surface 73ca is one face of the second arm 73c that faces a side opposite to the notch 75.

The first outer circumferential surface 73ba extends along the first opposed surface 77. As described above, the first opposed surface 77 before the caulking process is curved in a wave shape. For this reason, the first outer circumferential surface 73ba is curved in a wave shape along the first opposed surface 77. According to the example embodiment of the present disclosure, heat capacity of the first arm 73b may be made to uniformly approach in the circumferential direction of the coil lead line 35a. Due to the above, when the coil lead line 35a is welded to the inner circumferential surface of the notch 75, the welding section 79 may be uniformly provided in the circumferential direction of the coil lead line 35a.

The second outer circumferential surface 73ca extends along the second opposed surface 78. The second opposed surface 78 extends substantially linearly. For this reason, the second outer circumferential surface 73ca extends linearly and in parallel with the second opposed surface 78. According to the example embodiment of the present disclosure, heat capacity of the second arm 73c may be made to uniformly approach in the circumferential direction of the coil lead line 35a, and the welding section 79 may be uniformly provided.

Figure 11:
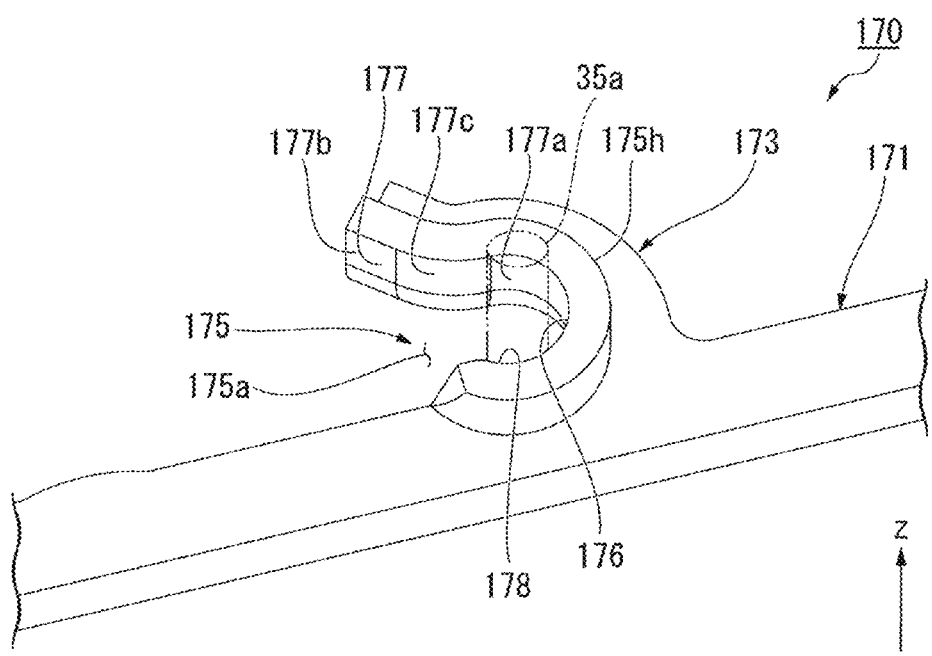
FIG. 11 is a perspective view showing a portion of a busbar of a first example modified embodiment of the present disclosure.

FIG. 11 is a perspective view of a busbar 170 of a first example modified embodiment applicable to the above-described example embodiment of the present disclosure.

The busbar 170 of the example modified embodiment mainly differs from the above-described example embodiment of the present disclosure in that this busbar 170 has a standing wall 175h. In addition, components which are the same as those in the above-described example embodiment of the present disclosure are represented by the same reference numbers, and a description thereof is omitted.

The busbar 170 includes a busbar main body 171, a conductive wire-connecting portion 173, and the standing wall 175h. The conductive wire-connecting portion 173 is connected to the busbar main body 171. The coil lead line 35a extending from the coil 35 is connected to the conductive wire-connecting portion 173.

The conducting wire-connecting portion 173 has a plate or substantially plate shape along a plane perpendicular to the axial direction. A notch 175 which is opened to one circumferential-directional side is provided on the conducting wire-connecting portion 173. The coil lead line 35a is inserted into the notch 175. An inner circumferential surface of the notch 175 has a bottom surface 176 opposing an opening 175a side of the notch 175, and a first opposed surface 177 and a second opposed surface 178 extending from the bottom surface 176 towards the opening 175a. The first opposed surface 177 and the second opposed surface 178 face to each other.

The first opposed surface 177 has a first region 177a and a second region 177b. The first region 177a is connected to the bottom surface 176. The second region 177b is connected to the first region 177a and extends towards the opening 175a side. A first convex portion 177c is provided between the first region 177a and the second region 177b.

Like the above-described example embodiment of the present disclosure, the conductive wire-connecting portion 173 of the example modified embodiment is in contact with the coil lead line 35a in the bottom surface 176, the second opposed surface 178 and the first region 177a of the first opposed surface 177 after the caulking process.

The standing wall 175h extends in the axial direction from the inner circumferential surface of the notch 175 of the conducting wire-connecting portion 173. The standing wall 175h extends upward. That is, the standing wall 175h extends to a side opposite to the stator 30 in the axial direction. In a process for molding the busbar 170 via a press working, the standing wall 175h is molded by performing a burring working which stands up in the upright position toward the upper side. The standing wall 175h after the caulking process is in contact with the outer circumferential surface of the coil lead line 35a. In addition, the standing wall 175h may be formed by a method other than the burring working.

According to the example modified embodiment of the present disclosure, the standing wall 175h extending in the axial direction is provided on the inner circumferential surface of the notch 175. Due to the above, it is possible to enlarge a contact area between the busbar 170 and the coil lead line 35a. Moreover, according to the example modified embodiment of the present disclosure, rigidity of the conducting wire-connecting portion 173 is increased by providing the standing wall 175h, so reliability of holding the coil lead line 35a in the conducting wire-connecting portion 173 may be increased.

After the caulking process, the conducting wire-connecting portion 173 and the coil lead line 35a are fixed to each other by a laser welding. According to the modified example embodiment of the present disclosure, since the standing wall 175h extends upward, spot of laser beam is irradiated to the standing wall 175h. Since the standing wall 175h has a small and uniform thickness dimension in the radial direction of the coil lead line 35a, heat capacity is small and uniform as compared with the conductive wire-connecting portion 173. For this reason, the standing wall 175h is rapidly and uniformly heated by being irradiated with the laser beam spot. Therefore, according to the example modified embodiment of the present disclosure, by providing the standing wall 175h extending upward, welding efficiency may be improved and may be provided the uniform welding section along the circumferential direction of the coil lead line 35a.

Figure 12:
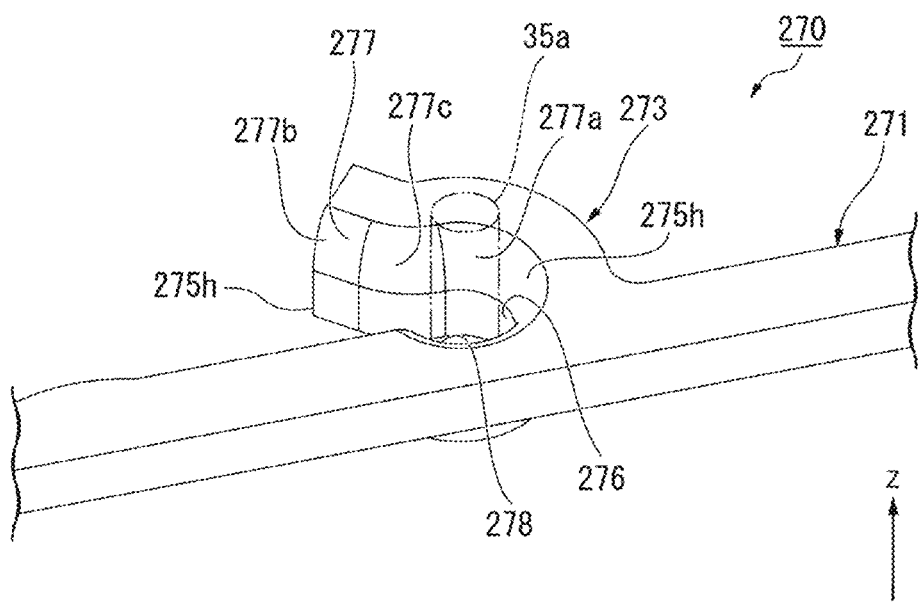
FIG. 12 is a perspective view showing a portion of a busbar of a second example modified embodiment of the present disclosure.

FIG. 12 is a perspective view of a busbar 270 of a second example modified embodiment applicable to the above-described example embodiment of the present disclosure. The busbar 270 of the example modified embodiment mainly differs from the above-described example embodiment in that the busbar 270 has a standing wall 275h. In addition, components which are the same as those in the above-described example embodiment of the present disclosure are represented by the same reference numbers, and a description thereof is omitted.

The busbar 270 includes a busbar main body 271, a conductive wire-connecting portion 273, and the standing wall 275h. The conducting wire-connecting portion 273 is connected to the busbar main body 271. The coil lead line 35a extending from the coil 35 is connected to the conductive wire-connecting portion 273.

The conducting wire-connecting portion 273 has a plate or substantially plate shape along a plane perpendicular to the axial direction. A notch 275 which is opened to one circumferential-directional side is provided on the conductive wire-connecting portion 273. The coil lead line 35a is inserted into the notch 275. An inner circumferential surface of the notch 275 has a bottom surface 276 opposing an opening 275a side of the notch 275, and a first opposed surface 277 and a second opposed surface 278 extending from the bottom surface 276 towards the opening 275a. The first opposed surface 277 and the second opposed surface 278 face to each other.

The first opposed surface 277 has a first region 277a and a second region 277b. The first region 277a is connected to the bottom surface 276. The second region 277b is connected to the first region 277a and extends towards the opening 275a side. A first convex portion 277c is provided between the first region 277a and the second region 277b.

Like the above-described example embodiment of the present disclosure, the conductive wire-connecting portion 273 of the example modified embodiment is in contact with the coil lead line 35a in the bottom surface 276, the second opposed surface 278 and the first region 277a of the first opposed surface 277 after the caulking process.

The standing wall 275h extends in the axial direction from the inner circumferential surface of the notch 275 of the conducting wire-connecting portion 273. The standing wall 275h extends downward. That is, the standing wall 275h extends towards the stator 30 side in the axial direction. In a process for molding the busbar 270 via a press working, the standing wall 275h is molded by performing a burring working which stands up in the upright position toward the lower side. For this reason, a connecting portion between an upper face of the conductive wire-connecting portion 273 and the standing wall 275h is smoothly curved in a direction in which the above portion is concaved downward. That is, the upper face (that is, the face opposing a side opposite to the stator 30) of the conductive wire-connecting portion 273 and the inner circumferential surface of the notch 275 are connected to each other via a tapered face 275k. The standing wall 275h after the caulking process is in contact with the outer circumference face of the coil lead line 35a. In addition, the standing wall 275h may be molded by a method other than the burring working.

According to the example modified embodiment of the present disclosure, since the standing wall 275h extending in the axial direction is provided on the inner circumferential surface of the notch 275, it is possible to enlarge a contact area between the busbar 270 and the coil lead line 35a. Moreover, according to the example modified embodiment of the present disclosure, rigidity of the conducting wire-connecting portion 273 is increased by providing the standing wall 275h, so reliability of holding the coil lead line 35a in the conducting wire-connecting portion 273 may be increased.

After the caulking process, the conducting wire-connecting portion 273 and the coil lead line 35a are fixed to each other by a laser welding. According to the example modified embodiment of the present disclosure, since the tapered face 275k is provided between the upper face of the conductive wire-connecting portion 273 and the inner circumferential surface of the notch 275, molten metal is collected between the tapered face 275k and the coil lead line 35a. For this reason, a welding section may be uniformly provided around the coil lead line 35a.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor, comprising:
a rotor including a shaft extending along a central axis;
a stator including a coil and opposing the rotor in a radial direction with a gap provided therebetween; and
a busbar positioned at one axial-directional side of the stator; wherein
the busbar includes a conducting wire-connecting portion connected to a conducting wire extending from the coil;
a notch into which the conducting wire is inserted is provided in the conducting wire-connecting portion;
an inner circumferential surface of the notch includes a bottom surface opposing an opening side of the notch, a first opposed surface extending from the bottom surface towards the opening, and a second opposed surface extending from the bottom surface towards the opening and opposing the first opposed surface;
the first opposed surface includes a first region connected to the bottom surface and a second region connected to the first region and extending to the opening side;
a first convex portion protruding towards the second opposed surface is provided on a first boundary portion between the first region and the second region;
the conducting wire-connecting portion is in contact with the conducting wire in the bottom surface, the second opposed surface and the first region of the first opposed surface;
the conducting wire-connecting portion is plate-shaped or substantially plate-shaped along a plane perpendicular or substantially perpendicular to an axial direction; and
the busbar includes a standing extending in the axial direction from an inner circumferential surface of the notch of the conducting wire-connecting portion.

2. The motor of claim 1, wherein the first region is curved along an outer circumferential surface of the conducting wire.

3. The motor of claim 1, wherein the conducting wire-connecting portion includes a first outer circumferential surface located on a side opposite to the first opposed surface, and the first outer circumferential surface extends along the first opposed surface.

4. The motor of claim 1, wherein the second opposed surface includes a third region connected to the bottom surface, and a fourth region connected to the third region and extending towards the opening side, a second convex portion protruding towards the first opposed surface side is provided at a second boundary portion between the third region and the fourth region, and the second opposed surface is in contact with the conducting wire in the third region.

5. The motor of claim 4, wherein the third region is curved along the outer circumferential surface of the conducting wire.

6. The motor of claim 1, wherein the bottom surface is provided with a concavity portion defined therein and extending to a side opposite to the opening side.

7. The motor of claim 1, wherein the bottom surface is curved along the outer circumferential surface of the conducting wire.

8. The motor of claim 1, wherein the standing wall extends to a side opposite to the stator in the axial direction.

9. The motor of claim 1, wherein the standing wall extends to the stator side in the axial direction, and a surface of the conducting wire-connecting portion opposing a side opposite to the stator and the inner circumferential surface of the notch are connected to each other via a tapered surface.

10. The motor of claim 1, wherein a welded portion is provided on an interface between the inner circumferential surface of the notch and an outer circumferential surface of a coil lead line.

11. The motor of claim 1, wherein the busbar includes a plurality of the conducting wire-connecting portions, and all of opening directions of the notches of the plurality of the conducting wire-connecting portions are directed towards one circumferential-directional side.

12. The motor of claim 1, further comprising a plurality of busbars and a busbar holder that holds the plurality of busbars, and all of opening directions of the notches of a plurality of the conducting wire-connecting portions are directed towards one circumferential-directional side.

13. A method of manufacturing a motor including a rotor including a shaft extending along a central axis, a stator including a coil and opposing the rotor in a radial direction with a gap provided therebetween, and a busbar positioned at one axial-directional side of the stator, the method comprising:
holding a conducting wire, which extends from the coil, on the busbar; wherein
the holding includes inserting the conducting wire into a notch provided in a conducting wire-connecting portion of the busbar and caulking the conducting wire-connecting portion in a direction in which the notch is closed;
an inner circumferential surface of the notch includes a bottom surface opposing an opening side of the notch, a first opposed surface extending from the bottom surface towards the opening, and a second opposed surface extending from the bottom surface towards the opening and opposing the first opposed surface;

the first opposed surface includes a first region connected to the bottom surface and a second region connected to the first region and extending to the opening side;

a convex portion protruding towards the second opposed surface is provided on a first boundary portion between the first region and the second region;

before the caulking, the second region is inclined in a direction in which the second region is spaced away from the second opposed surface, as it extends towards the opening side;

after the caulking, the conducting wire-connecting portion is in contact with the conducting wire in the bottom surface, the second opposed surface and the first region of the first opposed surface; and the busbar includes a plurality of the conducting wire-connecting portions, all of opening directions of the notches of the plurality of the conducting wire-connecting portions are directed towards one circumferential-directional side, and in the inserting, the busbar is rotated about the central axis to insert the conducting wire into each of the notches of the plurality of the conducting wire-connecting portions.

14. The method of manufacturing the motor of claim 13, wherein the motor includes a plurality of busbars and a busbar holder that holds the plurality of busbars, all of opening directions of the notches of the plurality of the conducting wire-connecting portions are directed towards one circumferential-directional side, and in the inserting, the busbar holder is rotated about the central axis to insert the conducting wire into each of the notches of the plurality of the conducting wire-connecting portions.

15. The method of manufacturing the motor of claim 13, further comprising joining the busbar and the conducting wire held on the busbar via laser welding.

16. A motor, comprising:
a rotor including a shaft extending along a central axis;
a stator including a coil and opposing the rotor in a radial direction with a gap provided therebetween; and
a busbar positioned at one axial-directional side of the stator; wherein
the busbar includes a conducting wire-connecting portion connected to a conducting wire extending from the coil;
a notch into which the conducting wire is inserted is provided in the conducting wire-connecting portion;
an inner circumferential surface of the notch includes a bottom surface opposing an opening side of the notch, a first opposed surface extending from the bottom surface towards the opening, and a second opposed surface extending from the bottom surface towards the opening and opposing the first opposed surface;
the first opposed surface includes a first region connected to the bottom surface and a second region connected to the first region and extending to the opening side;
a first convex portion protruding towards the second opposed surface is provided on a first boundary portion between the first region and the second region;
the conducting wire-connecting portion is in contact with the conducting wire in the bottom surface, the second opposed surface and the first region of the first opposed surface; and
the bottom surface is provided with a concavity portion defined therein and extending to a side opposite to the opening side.

\* \* \* \* \*